(No Model.)

I. M. INGRAM.
FLOUR SIFTER.

No. 482,576. Patented Sept. 13, 1892.

WITNESSES:
F. McArdle
C. Sedgwick

INVENTOR:
I. M. Ingram
BY Munn & Co.
ATTORNEYS

United States Patent Office.

IDA M. INGRAM, OF SEDALIA, MISSOURI.

FLOUR-SIFTER.

SPECIFICATION forming part of Letters Patent No. 482,576, dated September 13, 1892.

Application filed January 26, 1892. Serial No. 419,278. (No model.)

*To all whom it may concern:*

Be it known that I, IDA M. INGRAM, of Sedalia, in the county of Pettis and State of Missouri, have invented a new and Improved Flour-Sifter, of which the following is a full, clear, and exact description.

My invention relates to improvements in flour-sifters and in sifters for use in sifting other fine material. It is well known that to make certain varieties of fine bread or cake it is necessary to sift the flour several times, and it is also necessary to have the baking-powder or other ingredients thoroughly mingled with the flour. With a common single sifter this is a tedious operation; and the object of my invention is to produce a simple sifter which will at one operation practically sift the flour several times and which will also cause the flour, baking-powder, and other ingredients to be thoroughly mingled.

To this end my invention consists of a flour-sifter the construction of which will be hereinafter described and claimed.

Reference is to be had to the accompanying drawings, forming a part of this specification, in which similar figures of reference indicate corresponding parts in all the views.

Figure 1:
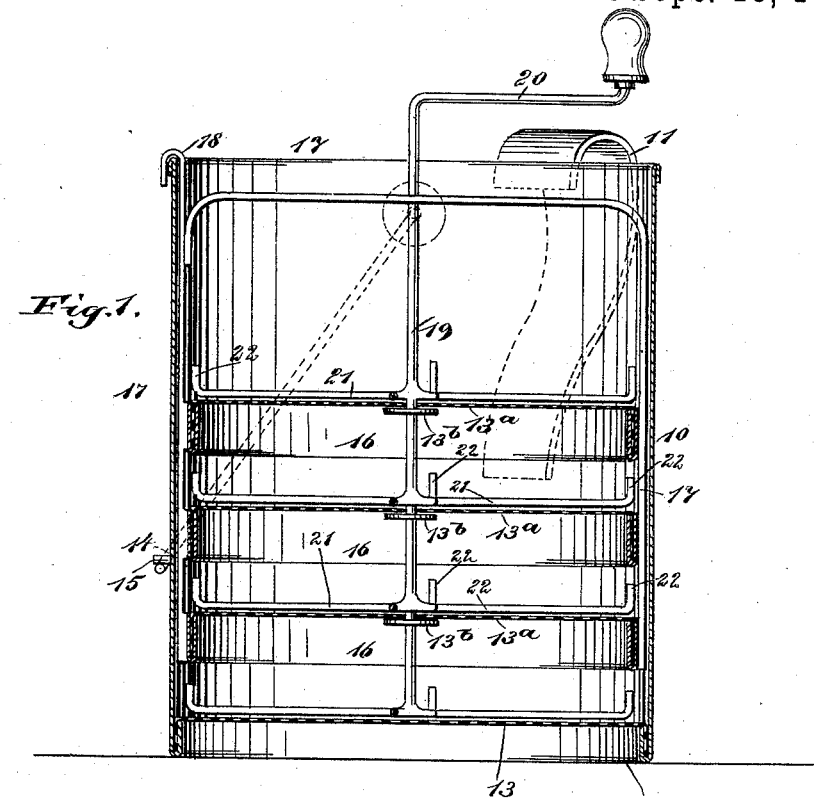
Figure 2:
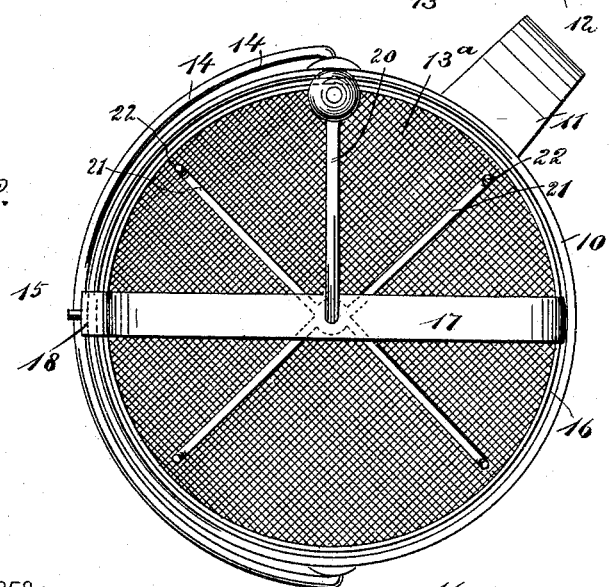
Figure 3:
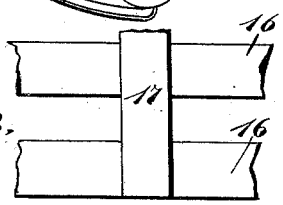

Figure 1 is a vertical section of the sifter embodying my invention. Fig. 2 is a plan view of the same, and Fig. 3 is a broken side elevation showing the manner in which the sieve-rims are secured to their supporting-bail.

The sifter is provided with a cylindrical body 10, which is open-ended, which is provided with a suitable handle 11, and which is doubled under at its lower edge, as shown at 12, so as to form a support for the sieve 13, which is stretched across the body near the bottom. The body is also provided with a swinging bail 14, by means of which it may be conveniently hung up or carried about, and the bail may be held down against the body by passing it beneath a catch 15, which is secured to one side of the body.

Above the sieve 13 are a series of removable sieves $13^a$, which are placed one above another and spaced conveniently, and each of these sieves is supported on a rim 16, which fits snugly within the body 10, and each sieve is also provided with a central washer $13^b$, which forms a bearing for the center shaft of the sifter. The rims 16 are connected by a bail 17, which extends up over the top of the upper rim and nearly to the top of the body 10, as shown in Fig. 1, and the sides of which are secured to each of the rims, thus holding them the right distance apart and enabling them to be inserted or removed simultaneously. The bail 17 is provided at one side with an upwardly-extending clip or hook 18, which may be hooked over the top of the body 10 and which serves to hold the sieves $13^a$ from dropping down too far. A vertical shaft 19 extends centrally through the sieves $13^a$ and a bail 17 nearly to the sieve 13, the shaft having its upper end formed into a crank 20, having a knob for a handle, and by means of the crank the shaft may be revolved. At a point above each of the sieves 13 and $13^a$ the shaft is provided with a plurality of radially-extending arms 21, which are arranged so as to rub the flour through the sieves, and the arms are turned up at their outer ends, as shown at 22, and these outer ends project sufficiently near the sides of the body 10 to prevent any appreciable amount of flour from adhering thereto.

When the device is operated, the flour is placed within the body in the usual way, and it will be seen that by turning the shaft 19 the arms 21 will all begin to revolve, and the flour when it issues from the bottom of the sifter will have passed through four sieves, so that it will in effect have been sifted four times. It will be understood, however, that a greater or less number of these sieves may be used, as desired. For certain purposes the various sieves may be made of different degrees of fineness, so that as the material passes down through it will be sifted finer and finer until it issues from the sifter.

It will be seen from the foregoing description that by taking hold of the bail 17 the removable sieves may be easily lifted from the body 10, and when the sieves are removed the fixed sieve 13 will of course be in place, and the device in this condition makes a very convenient strainer.

Having thus fully described my invention, I claim as new and desire to secure by Letters Patent—

1. A flour-sifter comprising a cylindrical body provided with a sieve in its bottom, a series of connected spaced sieves passed downward into the body and removable collectively therefrom, and a central shaft extending down through the connected sieves and provided with an agitator for each one of the connected sieves and having an agitator on its lower end for the body-sieve, substantially as set forth.

2. The combination, with the sifter-body, of a plurality of sieves arranged one above another within the body, a bail connecting the several sieves and extending to a point adjacent to the body-top, and a revoluble shaft mounted within the body and carrying projecting arms which move above the sieves, substantially as described.

3. The combination of the sifter-body, the removable sieves having a supporting-bail, and a hook secured to the bail and adapted to engage the body-top, substantially as described.

IDA M. INGRAM.

Witnesses:
G. L. FAULHABER,
A. M. TRADER.